(12) United States Patent
Lim et al.

(10) Patent No.: US 8,609,571 B2
(45) Date of Patent: Dec. 17, 2013

(54) PREPARATION METHOD OF SOLID CATALYST FOR POLYMERIZATION OF POLYPROPYLENE AND SOLID CATALYST USING THE SAME

(75) Inventors: Seong Soo Lim, Daejeon (KR); Young Kook Kim, Daejeon (KR)

(73) Assignee: Lotte Chemical Corporation, Seoul (KR)

( * ) Notice: Subject to any disclaimer, the term of this patent is extended or adjusted under 35 U.S.C. 154(b) by 0 days.

(21) Appl. No.: 13/519,444

(22) PCT Filed: Dec. 28, 2010

(86) PCT No.: PCT/KR2010/009422
§ 371 (c)(1),
(2), (4) Date: Jun. 27, 2012

(87) PCT Pub. No.: WO2011/081407
PCT Pub. Date: Jul. 7, 2011

(65) Prior Publication Data
US 2012/0289669 A1  Nov. 15, 2012

(30) Foreign Application Priority Data
Dec. 30, 2009 (KR) ........................ 10-2009-0134776

(51) Int. Cl.
*B01J 31/00* (2006.01)
*C08F 4/44* (2006.01)
*C08F 110/06* (2006.01)

(52) U.S. Cl.
USPC ........... 502/125; 502/104; 502/107; 502/128; 526/142; 526/143; 526/351

(58) Field of Classification Search
USPC .................................. 502/102, 128; 526/351
See application file for complete search history.

(56) References Cited

U.S. PATENT DOCUMENTS

| | | | |
|---|---|---|---|
| 4,330,649 A | 5/1982 | Kioka et al. | |
| 6,121,393 A | 9/2000 | Kioka et al. | |
| 6,323,150 B1 | 11/2001 | Kojoh et al. | |
| 6,800,580 B1* | 10/2004 | Yang et al. | 502/103 |
| 2006/0166814 A1* | 7/2006 | Leinonen et al. | 502/103 |
| 2007/0298964 A1* | 12/2007 | Yang et al. | 502/350 |

FOREIGN PATENT DOCUMENTS

KR  10-1991-0008283  10/1991

* cited by examiner

*Primary Examiner* — David Buttner
*Assistant Examiner* — Elizabeth Eng
(74) *Attorney, Agent, or Firm* — Volpe and Koenig, P.C.

(57) ABSTRACT

Disclosed is a method for preparing a solid catalyst for polymerization of polypropylene. The method includes: a) reacting a magnesium halide compound with alcohol and then adding a phthalic acid compound thereto to prepare a magnesium compound solution; b) mixing an aliphatic or alicyclic hydrocarbon solvent with an aromatic hydrocarbon solvent to prepare a mixed solvent, dispersing a titanium compound in the mixed solvent, and then reacting the titanium compound dispersed with the magnesium compound solution prepared in step a), and heating to produce a support; and c) reacting the support with the titanium used before disperse in step b) compound and an electron donor to obtain a solid product. When a catalyst prepared by the present disclosure is used, polypropylene with high activity and high bulk density characteristics may be prepared.

15 Claims, No Drawings

PREPARATION METHOD OF SOLID CATALYST FOR POLYMERIZATION OF POLYPROPYLENE AND SOLID CATALYST USING THE SAME

CROSS-REFERENCE TO RELATED APPLICATIONS

This application is based on and claims priority from Korean Patent Application No. 10-2009-0134776, filed on Dec. 30, 2009 with the Korean Intellectual Property Office, the present disclosure of which is incorporated herein in its entirety by reference. This application is a 35 U.S.C. §371 national phase application of PCT/KR2010/009422, which was filed Dec. 28, 2010 and is incorporated herein by reference as if fully set forth.

TECHNICAL FIELD

The present disclosure relates to a catalyst used for preparing polyolefin, and particularly to a method for preparing a Ziegler-Natta type solid catalyst for polymerization of polypropylene.

BACKGROUND

Catalysts for polymerization of polyolefin in the related art may be classified into Ziegler-Natta type catalysts, chromium-based catalysts and metallocene catalysts according to the kind of central metal. These catalysts are different from each other in catalyst activity, molecular weight distribution characteristics of a polymer and reaction characteristics for comonomers and thus are selectively used according to each preparation process and applied product.

Among them, Ziegler-Natta type catalysts are most commonly used and may be classified into magnesium-supported catalysts and silica-supported catalysts according to kinds of supports thereof.

There are two methods for preparing the magnesium-supported catalyst, and the first is a method, including: reacting a magnesium compound with an electron donor such as alcohol, amine, ether, ester, carboxylic acid and the like to prepare a magnesium compound solution, preparing the magnesium compound solution thus prepared into a solid form magnesium compound by a method such as spray drying, vacuum drying, and the like, and then reacting the compound with a titanium compound to finally prepare a solid catalyst for polymerization. And, the second is a method, including: reacting the magnesium compound solution in a solution state with a titanium compound to prepare a solid catalyst.

However, since a spherical solid catalyst support is first prepared by a method such as spray drying and the like in the first method, it is advantageous in that the final catalyst may also be produced in a spherical solid shape, but disadvantageous in that the first method includes more complicated preparation processes than the second method and has a wide particle size distribution of a manufactured solid catalyst.

Accordingly, many studies have been recently performed on the second method of obtaining a solid catalyst by directly reacting a magnesium compound solution with a titanium compound, which has a simple preparation process compared to the spray drying method.

In this regard, U.S. Pat. No. 6,323,150 describes a method for preparing a catalyst, by subjecting a magnesium compound to a primary treatment with a titanium compound including a polycarboxylic acid ester compound to obtain a solid-phase magnesium compound, heating the magnesium compound at from 70° C. to 130° C. to separate solid components and re-treating the separated solid components with the titanium compound. However, this technology is disadvantageous in that a substantially great amount of a titanium halide compound needs to be used during the preparation process, the process thereof is also complicated, and polypropylene (a propylene polymer) polymerized by using the same has a low bulk density of 0.45 g/ml or less.

U.S. Pat. No. 2007/0298964 relates to a method for preparing a solid titanium catalyst for alpha-olefin polymerization, and the method includes: dissolving a magnesium halide compound in a mixed solvent of cyclic ether and one or more alcohols, reacting the resulting magnesium compound solution with hydrocarbon including a titanium alkoxy halide compound and a halogen element to prepare a support, and reacting the prepared support with a titanium compound and an electron donor to prepare a solid complex titanium catalyst for polymerization of alpha-olefin. However, it is disadvantageous in that the polypropylene polymerized by using a catalyst prepared by this technology also has a bulk density of 0.43 g/ml or less.

SUMMARY

The present disclosure has been made in an effort to prepare a high activity solid catalyst for polymerization of polypropylene with high yield by a simple preparation process.

The present disclosure also has been made in an effort to obtain a polypropylene having high activity and high bulk density characteristics by using the solid catalyst to polymerize polypropylene.

An exemplary embodiment of the present disclosure provides a method for preparing a solid catalyst for polymerization of polypropylene, including: a) reacting a magnesium halide compound with alcohol and then adding a phthalic acid compound thereto to prepare a magnesium compound solution; b) mixing an aliphatic or alicyclic hydrocarbon solvent with an aromatic hydrocarbon solvent to prepare a mixed solvent, dispersing a titanium compound in the mixed solvent prepared and then reacting the titanium compound with the prepared magnesium compound solution and then heating to produce a support; and c) reacting the support with the titanium compound and an electron donor to obtain a solid product.

Another exemplary embodiment of the present disclosure provides a solid catalyst for polymerization of polypropylene, which is prepared by the above-described preparation method. Here, the solid catalyst has a particle size of preferably from 10 to 30 μm and more preferably a spherical shape.

DETAILED DESCRIPTION

Hereinafter, the above-described present disclosure will be described in more detail.

As used herein, the "polymerization" means to include not only a single polymerization, but also a copolymerization, and the "polymer" means to include not only a single polymer, but also a copolymer.

As used herein, the "polypropylene" is a concept that includes a single polymer of propylene, a block or irregular copolymer with other □-olefins having 2 to 18 carbon atoms and the like. Examples of the other □-olefins include ethylene, 1-butene, 1-pentene, 1-hexene, 1-octene and the like. The amount of □-olefin copolymerized with propylene is preferably in a range of from 0 to 50 mole % per mole of propylene.

<Method for Preparing Solid Catalyst for Polymerization of Polypropylene and Solid Catalyst for Polymerization of Polypropylene Prepared by the Same>

1. Preparation of Magnesium Compound Solution

The method for preparing a solid catalyst for polymerization of polypropylene according to the present disclosure includes reacting a magnesium halide compound with alcohol and adding a phthalic acid compound thereto to prepare a magnesium compound solution.

That is, a magnesium halide compound is dissolved in alcohol in the presence or absence of one or more hydrocarbon solvents to prepare a homogeneous solution at a high temperature, and then a phthalic acid compound such as phthalic anhydride or a 1,2-phthaloyl dichloride compound is added thereto to prepare a magnesium halide solution.

Here, the reacting of the magnesium halide compound with alcohol is preferably performed by reacting the magnesium halide compound with alcohol in the presence of a hydrocarbon solvent, and in this case, a homogenous solution of a magnesium halide compound and alcohol may be obtained while a small amount of alcohol is used. That is, the magnesium halide solution is reacted with a titanium compound while being maintained in a low temperature state to finally prepare a solid product. If the magnesium halide compound is dissolved in only alcohol and cooled to a low temperature to prepare a homogenous solution, an excess amount of alcohol needs to be used. However, if a hydrocarbon solvent is used together with alcohol, the amount of alcohol added may be reduced. As the amount of alcohol added increases, the amount of a titanium compound to be reacted with the magnesium halide compound needs to increase, and thus the reaction is preferably performed together with alcohol in the presence of a hydrocarbon solvent.

The magnesium halide compound used in the present disclosure is a compound that does not have reducibility, and examples thereof include magnesium chloride, magnesium dichloride, magnesium fluoride, magnesium bromide, magnesium iodide, phenoxy magnesium chloride, isoproxy magnesium chloride, butoxy magnesium chloride and the like. Among them, magnesium dichloride is suitably used because magnesium dichloride is structurally and coordinatively stable with titanium tetrachloride as a main active metal and shows high activity with the metal.

The alcohol that reacts with the magnesium halide compound is not particularly limited, but examples thereof include an aliphatic or alicyclic alcohol such as ethanol, n-propanol, isopropanol, n-butanol, isobutanol, n-pentanol, isopentanol, neopentanol, cyclopentanol, n-hexanol, n-heptanol, n-octanol, decanol, dodecanol, 2-methylpentanol, 2-ethylbutanol, 2-ethylhexanol and the like; an alicyclic alcohol such as cyclohexanol, methylcyclohexanol and the like; and an aromatic alcohol such as benzyl alcohol, methylbenzyl alcohol, isopropylbenzyl alcohol, □-methylbenzyl alcohol and the like. Among them, an aliphatic or alicyclic alcohol or an alcohol having two or more carbon atoms is preferably used, and specifically, 2-ethylhexanol is more preferably used. That is, since alcohols having lower carbon atoms are not mixed with hydrocarbon solvents, it is difficult to prepare a homogenous magnesium halide compound solution, and thus a branched alcohol having two or more carbon atoms, and specifically, six or more carbon atoms is preferably used.

The amount of the alcohol introduced is in a range of from 1 to 10 moles based on 1 mole of a magnesium halide compound, and the reaction is particularly preferably performed at a ratio in a range of from 2 to 6 moles. When the amount of alcohol introduced is less than 1 mole, a magnesium halide compound may not be dissolved as a homogenous solution. When the amount is more than 10 moles, the amount of a titanium compound used need to increase more than necessary when a magnesium compound solution is reacted with a titanium compound solution to obtain a solid support.

A homogenous solution is readily prepared when the magnesium halide compound and alcohol are reacted in the presence of a hydrocarbon solvent. In this case, an available hydrocarbon solvent may be a solvent including an aliphatic hydrocarbon such as hexane, heptane, octane, decane, dodecane, tetradecane, mineral oil and the like; an aromatic hydrocarbon such as benzene, toluene, xylene, ethyl benzene, cumene and the like; and the like. More specifically, in order to prepare a homogenous magnesium halide compound solution, an aliphatic or alicyclic hydrocarbon having 5 to 20 carbon atoms is preferred, and among them, an aliphatic or alicyclic hydrocarbon solvent having 6 to 17 carbon atoms is most preferred. The amount of the hydrocarbon solvent used is preferably used to be present in a molar ratio of from 0.2 to 2 based on the alcohol to be reacted. When the amount of the hydrocarbon solvent used is less than the range, it is difficult to obtain a homogeneous magnesium halide compound solution at a low temperature. When the amount is more than the range, the volume of the reactor in the process increases and it may be difficult to maintain the temperature of the reactor at a low temperature when the reaction is performed together with the titanium compound.

When the magnesium halide compound is dissolved in alcohol, the dissolution temperature is preferably from 70 to 150° C., and the upper limit of the dissolution temperature is suitably controlled so as not to be higher than the boiling point of the hydrocarbon solvent used. In order to disperse the solution thoroughly, a stirrer may be installed in a reactor to ensure sufficient stirring.

As described above, the magnesium halide compound is completely dissolved in alcohol, and then after a phthalic acid compound is added thereto to maintain a sufficient reaction time, the magnesium compound solution thus prepared is preferably cooled to 40° C. or less for stable storage. Here, the phthalic acid compound serves as a precipitation promoter, and is preferably phthalic anhydride or 1,2-phthaloyl dichloride, which may promote the precipitation of a catalyst and increase the yield of the catalyst accordingly prepared. The amount of the phthalic acid compound added at this time is preferably added at a ratio of from 0.03 to 3 moles per mole of the magnesium halide compound.

2. Production of Support

The present disclosure includes reacting a mixed solvent, in which an aliphatic or alicyclic hydrocarbon solvent is mixed with an aromatic hydrocarbon solvent and a titanium compound is dispersed, with the magnesium compound solution prepared above, and then heating the mixed solvent to produce a support.

That is, the magnesium compound solution prepared as above is reacted with a titanium compound dispersed in two or more hydrocarbon solvents to form a solid support. For this purpose, it is necessary to mix one or more aliphatic or alicyclic hydrocarbon solvents with one or more aromatic hydrocarbon solvents at a low temperature in a separate reactor and disperse a titanium compound therein, and then the magnesium compound solution prepared above is introduced therein.

In the case of a catalyst for polymerization of polypropylene, the uniformity of the active sites of the catalyst is very important. In general, in order to improve the uniformity of the active sites of the catalyst, a solid product formed by reacting the magnesium compound solution with the titanium compound needs to be reacted with the titanium compound alone or a combination of the titanium compound and an electron donor twice or more. However, in the present disclosure, the uniformity of the active sites of the catalyst may be improved even by reacting the solid product obtained from the reaction of the magnesium compound solution and the titanium compound with the titanium compound and the electron donor only once, and thus the preparation process of the catalyst may be simplified to improve the efficiency of the preparation process.

Meanwhile, the present disclosure uses a mixed solvent in which two or more solvents are mixed as a solvent for producing a support, and examples of the mixed solvent for this include a mixed solvent in which an aliphatic hydrocarbon such as hexane, heptane, octane, decane, dodecane, tetradecane, kerosene, mineral oil and the like, or an alicyclic hydrocarbon such as cyclohexane, cyclooctane, methylcyclpentane, methylcyclohexane and the like, and an aromatic hydrocarbon such as benzene, toluene, xylene, ethyl benzene, cumene and the like are mixed. The aliphatic or alicyclic hydrocarbon is preferably a hydrocarbon solvent having 5 to 20 carbon atoms, more specifically, the hydrocarbon is more preferably an aliphatic hydrocarbon having 5 to 14 carbon atoms or an alicyclic hydrocarbon having 5 to 14 carbon atoms, and more specifically, the hydrocarbon is suitably hexane, heptane and the like. The aromatic hydrocarbon is preferably an aromatic hydrocarbon having 6 or more carbon atoms and most preferably toluene among them.

That is, when a mixed solvent, in which each of an aliphatic or alicyclic hydrocarbon solvent having a boiling point lower than the boiling point of an aromatic hydrocarbon solvent is selected and mixed, is used to prepare a catalyst and then polyolefin is polymerized, a polyolefin with a bulk density improved may be obtained. Accordingly, when toluene having a boiling point of around 110° C. as an aromatic hydrocarbon is used, hexane, heptane or the like is preferably used as an aliphatic or alicyclic hydrocarbon.

By using a mixed solvent of one or more aliphatic or alicyclic hydrocarbon solvents and one or more aromatic hydrocarbon solvents in the present disclosure, the aliphatic or alicyclic hydrocarbon solvent and a magnesium compound solution may be uniformly dispersed in the aromatic hydrocarbon to form uniform catalyst particles.

In the present disclosure, a solid-type support having a uniform particle size and a smooth surface may be prepared by controlling the molar ratio of the aromatic hydrocarbon and the aliphatic or alicyclic hydrocarbon included in the mixed solvent.

When the mixed solvent is used, in which the aliphatic or alicyclic hydrocarbon is mixed at a molar ratio in a range of from 0.1 to 10 and more specifically from 0.2 to 3 for the aromatic hydrocarbon, it is possible to prepare a solid catalyst for polymerization of polypropylene in which the solid catalyst to be prepared has a uniform particle size distribution and the particle surface of the catalyst has a smooth spherical shape.

Meanwhile, the titanium compound dispersed in the mixed solvent may be represented by the general formula of $Ti(OR)_{4-m}X_m$. Here, R is an aliphatic hydrocarbyl group having 1 to 14 carbon atoms or an alicyclic hydrocarbyl group having 1 to 14 carbon atoms, X is selected from the group consisting of a halogen element such as F, Cl, Br and the like and mixtures thereof, and m is an integer of 1 to 4. Examples of the titanium compound may be selected from the group consisting of titanium tetrachloride, titanium tetrabromide, titanium tetraiodide, tetrabutoxy titanium, tetraethoxy titanium, diethoxy titanium dichloride, ethoxy titanium trichloride and mixtures thereof, and among them, titanium tetrachloride, which has excellent activity and physical properties, is preferably used.

When a titanium compound dispersed in two or more hydrocarbon mixed solvents and a magnesium compound solution are introduced to be reacted with each other in this manner, it is preferred that a reactor in which the titanium compound is dispersed is maintained at a temperature in a range of from −50 to 50° C. and more specifically in a range of from −30 to 30° C. If the temperature of the reactor is out of the ranges, the particle size uniformity of a solid product (support) produced may be deteriorated. In this case, a rapid reaction with the titanium compound should not occur when the magnesium compound solution is added, and in order to disperse the solution thoroughly, a stirrer is preferably installed in the reactor to ensure sufficient stirring.

The reactor into which two or more hydrocarbon mixed solvents in which the titanium compound is dispersed are introduced is maintained at a heating rate of around 0.5° C./min until the temperature of the reactor reaches 20° C. after the magnesium compound solution is introduced and subjected to a process of maintaining a low temperature state for 30 min to 1 hr, and it is suitable that the temperature of the reactor is increased at a rate of 1° C./min after the reactor is subjected to a maintenance (aging) state at 20° C. for about 30 min to 1 hr. In this case, it is preferred that when hexane is used as the aliphatic or alicyclic hydrocarbon solvent, the temperature is increased up to 74° C. and the reactor is aged at 74° C. for 2 hr. The increasing of the temperature of the reactor up to 20° C. slowly in this manner has an effect of suppressing non-uniform catalyst particles from being produced by rapid reactions when initial catalyst particles are produced.

Another characteristic of the present disclosure is that in heating the mixed solvent after being reacted with a magnesium compound solution, the mixed solvent is heated to a temperature range of 10° C. higher than the boiling point of a hydrocarbon solvent having the lowest boiling point in the aliphatic or alicyclic hydrocarbon solvent and the aromatic hydrocarbon solvent. That is, the titanium compound and the magnesium halide compound solution are sufficiently reacted by heating the mixed solvent to a temperature range (for example, when the hydrocarbon solvent has a lowest boiling point of 100° C., the mixed solvent is heated by from 0 to 10° C.) of 10° C. higher than the lowest boiling point of the aliphatic or alicyclic hydrocarbon solvent used as the mixed solvent. Accordingly, the active sites of a catalyst produced from the titanium compound are uniformly distributed, and thus the heating has an effect that the physical properties of polypropylene finally obtained may be uniformly obtained. When the solid support is treated with the titanium compound and an internal electron donor, the physical stability of the solid catalyst may be ensured to decrease the breakage of catalyst particles, thereby minimizing the generation of fine particles.

Meanwhile, in the present disclosure, in producing a support by heating the mixed solvent after being reacted with the magnesium compound solution, it is also possible to produce a solid support by reacting the mixed solvent together with the magnesium compound solution and the electron donor, and then heating and aging the resulting compound.

As described above, in order to remove unreacted materials of the reaction and reaction residues at the final reaction temperature after the reaction of the titanium compound with the magnesium compound solution has been completed, it is preferred that the resulting compound is washed with the above-mentioned aromatic hydrocarbon and aliphatic or alicyclic hydrocarbon solvent to obtain a first solid catalyst.

More specifically, it is possible to wash the first solid catalyst by using toluene as the aromatic hydrocarbon and hexane as the aliphatic or alicyclic hydrocarbon.

3. Obtaining of Solid Product

The present disclosure includes reacting the support produced above with a titanium compound and an electron donor to obtain a solid product.

That is, the produced solid support is reacted with a titanium halide compound and an aromatic carboxylic acid ester-based internal electron donor preferably in the presence of a hydrocarbon solvent to obtain a final solid catalyst. Specifically, the support produced above is reacted with the titanium compound and electron donor described above, and is subjected to a process of heating the resulting compound to a temperature in a range of from 80 to 130° C., aging the compound for a period of time in a range of from 1 to 3 hr, and then washing the compound. The detailed description thereof will be as follows.

First, the solid support is dispersed in one or more aromatic hydrocarbon solvents and cooled to a low temperature. Next, the temperature of the reactor is maintained in a range of from −40 to 40° C. and more preferably from −20 to 20° C. such that a rapid reaction does not proceed when the titanium compound is introduced therein, and then a titanium compound is slowly introduced therein. After the titanium compound is completely introduced, it is preferred that the temperature at the introduction is maintained for about from 30 min to 1 hr. Here, the reacting of the solid support with the titanium compound and the electron donor may be repeated twice or more. When the reacting of the solid support thus produced with the titanium compound and the electron donor is repeated twice or more, the uniformity of active sites of a catalyst prepared may be increased. More specifically, it is suitable to repeat the process from twice to five times. When the repetition is more than five times, the uniformity of active sites of the catalyst may be increased, but the process may be complicated and preparation costs may be increased.

Then, the reactor is heated to 110° C. at a heating rate of 1° C./min, and then an internal electron donor is introduced when the temperature of the reactor reaches 70° C. In this case, available internal electron donors are not particularly limited, but a phthalate-based compound, a carboxylic acid ester compound or a diether compound is suitable.

Specifically, the phthalate-based compound may be selected from the group consisting of monoethoxyphthalate, dimethylphthalate, methylethylphthalate, diethylphthalate, di-normalpropylphthalate, diisopropylphthalate, di-normalbutylphthalate, diisobutylphthalate, di-normaloctylphthalate, dipentylphthalate or mixtures thereof.

The carboxylic acid ester compound may be selected from the group consisting of methylacetate, ethylacetate, phenylacetate, ethylpropanate, ethylbutyrate, diethylmalonate or mixtures thereof.

The diether compound may be selected from the group consisting of 1,3-diether type, such as 2,2-dimethyl-1,3-dimethoxypropane, 2,2-diisopropyl-1,3-dimethoxypropane, 2,2-diisobutyl-1,3-dimethoxypropane, 2,2-diisobutyl-1,3-diethoxypropane, 2,2-diisobutyl-1,3-dibutoxypropane or mixtures thereof.

Here, it is preferred that the amount of the internal electron donor introduced is at a ratio of from 0.01 to 2 moles per mole of the magnesium halide compound and more specifically from 0.01 to 1 mole, per mole of the magnesium halide compound in the magnesium compound solution which is initially introduced. When the amount of the internal electron donor introduced is out of the range, the uniformity of active sites of a catalyst finally obtained may be decreased. It is preferred that the internal electron donor is introduced, subjected to reaction maintaining for 0.5 to 2 hr, and then heated to from 110 to 130° C., and subjected to reaction maintaining for 0.5 to 3 hr.

The temperature of the reactor may be increased and maintained, then washing may be first performed with the above-mentioned aromatic hydrocarbon solvent at 100° C. or less several times, and subsequently, the catalyst may be washed with the above-mentioned aliphatic or alicyclic hydrocarbon solvent at a boiling point of the aliphatic or alicyclic hydrocarbon solvent or less to prepare a final solid catalyst. The aromatic hydrocarbon solvent used for washing is not particularly limited, but is preferably toluene. The aliphatic or alicyclic hydrocarbon solvent is not particularly limited, but hexane is preferably used.

Meanwhile, in order to obtain catalyst particles present in the form of slurry in the hydrocarbon solvent, it is preferred that the process of removing remaining unreacted titanium compounds, stopping the stirring of the stirrer to settle solid catalyst particles, and then removing a supernatant solution is repeated several times. Subsequently, catalyst particles from which the titanium compound has been removed may be ventilated under a nitrogen stream for 4 hr or more and dried to obtain desired catalyst particles.

As described above, according to the preparation method of the present disclosure, a solid catalyst for polymerization of polypropylene with high activity may be prepared at a high yield by a relatively simple method. The solid catalyst for polymerization of polypropylene thus prepared has a spherical shape (due to the spherical shape, the transport problem may be reduced during the polymerization process of polypropylene) and particle size characteristics in a range of from 10 to 30 μm, and thus polypropylene having high activity and high bulk density may be prepared when polypropylene is polymerized.

When polypropylene is prepared by using the solid catalyst prepared by the present disclosure, the polypropylene prepared may have a bulk density of 0.45 g/ml or more and specifically from 0.45 to 0.52 g/ml. In this way, the present disclosure may improve the productivity of polypropylene per unit process because the bulk density of polypropylene may be increased.

<Preparation of Polypropylene>

The solid catalyst according to the present disclosure, which is prepared by the above method, may be used for polymerization of polypropylene in the gas-phase, bulk-phase or slurry-phase, and for polymerization methods, typical methods known in the art may be applied. In this case, in the case of the bulk-phase or slurry-phase polymerization, a separate solvent or propylene itself may be used as a medium.

Meanwhile, the polymerization temperature of polypropylene is suitably from 0 to 200° C. and specifically from 50 to 150° C., and the polymerization pressure is suitably from 1 to 100 atm and specifically from 2 to 40 atm.

In the process of polymerizing polypropylene under the above-described polymerization conditions, alkyl aluminum as a co-catalyst, an external electron donor, a catalyst (specifically the solid catalyst according to the present disclosure) and hydrogen are added to a polymerization reactor, propylene is introduced, and a polymerization reaction is carried out for a certain time to form a solid particle polymer (specifically polypropylene). Through the polymer thus prepared, the activity of the catalyst prepared by the present disclosure and the physical properties of the polymer may be confirmed. Here, non-limiting examples of the material which is available as an alkyl aluminum compound include trimethyl aluminum, triethyl aluminum, triisobutyl aluminum, diethylaluminum chloride, ethylaluminum dichloride, ethylaluminum sesquichloride and the like, and non-limiting examples of the material which is available as the external electron donor include a silane compound such as cyclohexylmethyl dimethoxysilane, dicyclopentyl dimethoxysilane, diisopropyl dimethoxysilane, vinyltriethoxysilane and the like, or a mixture of the silane compounds.

The present disclosure may be more specifically understood by the following Examples, and the following Examples are only an example for illustrating the present disclosure and are not intended to limit the scope of the present disclosure.

Example 1

(1) Preparation of Magnesium Compound Solution

A 2-liter pressure resistant glass reactor equipped with a stirrer and an oil circulation heater was sufficiently ventilated with nitrogen, and then 47.6 g of anhydrous magnesium dichloride, 274.5 ml of 2-ethylhexanol and 200 ml of decane were introduced therein under nitrogen atmosphere, followed by stirring at 130° C. at a revolution speed of 500 rpm. When the magnesium compound was completely dissolved to obtain a homogeneous solution, the solution was aged for 1 hr, 10.8 ml of 1,2-phthaloyl dichloride was introduced therein for 30 min and 1,2-phthaloyl dichloride was completely introduced, followed by aging at 130° C. for 1 hr. After the aging for 1 hr, the temperature of the reactor was decreased to 30° C. and the solution was stored.

(2) Production of Solid Support

Another 3-liter pressure resistant glass reactor equipped with a stirrer and an oil circulation heater was sufficiently ventilated with nitrogen, and then 650 ml of toluene, 850 ml of hexane and 438.6 ml of titanium tetrachloride were introduced therein under nitrogen reflux, and the reactor was cooled to −20° C. while being stirred at 500 rpm to prepare a mixed solvent.

The magnesium dichloride solution prepared above was added over 4 hr to the reactor into which the titanium compound dispersed in a mixed solvent of hexane and toluene was introduced. After the magnesium compound solution was completely introduced, the solution was maintained for 1 hr and then heated at a rate of 0.5° C./min until the temperature of the reactor reached 20° C. When the temperature of the reactor reached 20° C., the solution was aged for 1 hr.

After the solution was aged at 20° C. for 1 hr, the reactor was heated at a heating rate of 1° C./min until the temperature of the reactor reached 74° C. After the temperature reached 74° C., the solution was aged for 2 hr and then was washed with 1 L of toluene at 74° C. three times.

(3) Preparation of Solid Titanium Catalyst

As described above, the solution was washed with 1 L of toluene three times, and then the reactor was again filled with 1 L of toluene to maintain the temperature of the reactor at −10° C. When the temperature of the reactor reached −10° C., 219.3 ml of titanium tetrachloride was introduced therein within 30 min. After titanium tetrachloride was completely introduced, the reactor was maintained at −10° C. for 30 min. After maintaining the temperature, the reactor was heated at a heating rate of 1° C./min until 70° C., and when the temperature reached 70° C., 20.1 ml of diisobutyl phthalate was introduced therein over 30 min. After diisobutyl phthalate was completely introduced, the solution was aged for 1 hr.

After the reactor was maintained at 70° C. for 1 hr, the reactor was heated at a rate of 1° C./min until 110° C. and maintained for 2 hr, and then the stirring of the stirrer was stopped and the solid catalyst was precipitated, followed by removal of the supernatant. After the supernatant was removed except for the precipitated solid of the reactor, the solid was washed four times with 1 L of toluene and six times with 1 L of hexane to obtain a final slurry solid catalyst, the final catalyst slurry was dried with nitrogen to obtain a solid catalyst for polymerization of solid-state polypropylene, and the mass of the catalyst was measured to calculate the yield of the catalyst. The result is shown in the following Table 1.

As a result of observing the particle size and shape of the catalyst finally obtained by using a scanning electron microscope (SM-701, manufactured by TOPCON Corporation), it was confirmed that spherical catalyst particles had been formed and the polymerization characteristics of the catalyst prepared were a bulk-phase polymerization. A specific polymerization method of polypropylene is as follows.

First, a 2 L high pressure reactor heated to 120° C. was ventilated with nitrogen for 1 hr to change the state of the high pressure reactor into a nitrogen atmosphere. The reactor was cooled to 25° C. under nitrogen atmosphere and ventilated with propylene to be maintained under propylene atmosphere. 2 millimole of triethyl aluminum diluted in a decane solvent at a concentration of 1 M was introduced into the reactor which was maintained under a propylene gas atmosphere and a cyclohexyl methyl dimethoxy silane external electron donor diluted in a decane solvent was introduced therein so as to obtain a molar ratio of Si/Ti of 30. The catalyst while being diluted in a decane solvent was introduced therein as a basis of 0.005 g, 1,000 ml of hydrogen was introduced therein, then 500 g of propylene was introduced therein, and the stirrer was operated to perform a pre-polymerization for 5 min. After the pre-polymerization, the reactor was heated to 70° C. to perform polymerization at 70° C. for 1 hr, then unreacted propylene was discharged into the atmosphere, and the temperature of the reactor was reduced to normal temperature. The polypropylene produced was dried at 50° C. in a vacuum oven for 10 hr and then weighed, and the bulk density thereof and the xylene soluble were measured. The measurement result is shown in the following Table 1.

Example 2

Catalyst particles and polypropylene were obtained in the same manner as in Example 1, except that as dispersion solvents in the first titanium compound reactor in Example 1, hexane and toluene were introduced in volumes of 650 ml and 850 ml, instead of 850 ml and 650 ml, respectively. The result is shown in the following Table 1.

Example 3

Catalyst particles and polypropylene were obtained in the same manner as in Example 1, except that as dispersion solvents in the first titanium compound reactor in Example 1, hexane and toluene were introduced in volumes of 450 ml and 1,050 ml, instead of 850 ml and 650 ml, respectively. The result is shown in the following Table 1.

Comparative Example 1

Catalyst particles and polypropylene were obtained in the same manner as in Example 1, except that as dispersion solvents in the first titanium compound reactor in Example 1, hexane and toluene were introduced in volumes of 1,200 ml and 300 ml, instead of 850 ml and 650 ml, respectively. The result is shown in the following Table 1.

Comparative Example 2

Catalyst particles and polypropylene were obtained in the same manner as in Example 1, except that as dispersion solvents in the first titanium compound reactor in Example 1, toluene was not used and hexane was alone introduced in a volume of 1,500 ml. The result is shown in the following Table 1.

Comparative Example 3

Catalyst particles and polypropylene were obtained in the same manner as in Example 1, except that as dispersion solvents in the first titanium compound reactor in Example 1, hexane was not used and toluene was alone introduced in a volume of 1,500 ml. The result is shown in the following Table 1.

TABLE 1

| | Example 1 | Example 2 | Example 3 | Comparative Example 1 | Comparative Example 2 | Comparative Example 3 |
|---|---|---|---|---|---|---|
| Hydrocarbon volume ratio (hexane/toluene) | 0.77 | 0.43 | 1.31 | 4.0 | — | — |
| Polymerization activity (g-PP/g-cat*hr) | 44,300 | 37,500 | 22,400 | 21,200 | 21,000 | 31,400 |
| Catalyst yield % (Catalyst mass/amount of magnesium compound introduced) | 110 | 94 | 118 | 121 | 125 | 79 |
| Catalyst particle size (μm) | 25 | 22 | 16 | 9 | 8 | 7 |
| Polypropylene Bulk density (g/mL) | 0.49 | 0.47 | 0.45 | 0.36 | 0.34 | 0.41 |
| Stereo regularity (XIS) | 99.1 | 98.0 | 96.7 | 95.8 | 95.7 | 96.5 |
| Polypropylene Particle size distribution[Note 1] | 2.1 | 2.2 | 2.3 | 2.4 | 2.4 | 3.3 |

(Note 1):
Particle size distribution index $D_{10}/D_{90}$ of Polymerized product As shown in Table 1, it could be confirmed that polypropylene polymerized in Examples 1 to 3 according to the present disclosure had a bulk density of 0.45 g/ml or more, which was excellent, compared to Comparative Examples 1 and 2. It could also be confirmed that polypropylene obtained in Examples 1 and 2 according to the present disclosure showed significantly higher polymerization activity than polymerization in Comparative Examples 1 and 2.

According to the present disclosure, in reacting a titanium compound dispersed in a solvent with a magnesium compound dissolved in alcohol to form a support for a solid catalyst, a solid catalyst for polymerization of polypropylene with high activity may be prepared at a high yield by a relatively simple method by using a mixed solvent in which two or more solvents are mixed as the solvent.

When the solid catalyst of the present disclosure is used to polymerize polypropylene, polypropylene with high activity and high bulk density characteristics may be obtained.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for preparing a solid catalyst for polymerization of polypropylene, comprising:
   a) reacting a magnesium halide compound with alcohol and then adding a phthalic acid compound thereto to prepare a magnesium compound solution;
   b) mixing an aliphatic or alicyclic hydrocarbon solvent with an aromatic hydrocarbon solvent to prepare a mixed solvent,
   dispersing a titanium compound in the mixed solvent,
   and then reacting the titanium compound dispersed with the magnesium compound solution prepared in step a), and heating to produce a support; and
   c) reacting the support containing the titanium compound used in step b) and an electron donor to obtain a solid product,
   wherein the aliphatic or alicyclic hydrocarbon solvent in step b) is mixed at a ratio in a range from 0.2 to 3 moles per mole of the aromatic hydrocarbon solvent.

2. The method of claim 1, wherein in step a), the magnesium halide compound is reacted with the alcohol in the presence of a hydrocarbon solvent.

3. The method of claim 1, wherein the phthalic acid compound in step a) is phthalic anhydride or a 1,2-phthaloyl dichloride compound.

4. The method of claim 1, wherein in step a), the alcohol is reacted at a ratio in a range of from 1 to 10 moles per mole of the magnesium halide compound.

5. The method of claim 2, wherein the hydrocarbon solvent used in the reaction of the magnesium halide compound and the alcohol is an aliphatic hydrocarbon solvent having 5 or more carbon atoms or an alicyclic hydrocarbon solvent having 5 or more carbon atoms, and is present at a ratio in a range of from 0.2 to 2 moles with respect to the alcohol in step a).

6. The method of claim 1, wherein the phthalic acid compound in step a) is added at a ratio in a range of from 0.03 to 3 moles per mole of the magnesium halide compound.

7. The method of claim 1, wherein in step b), the aliphatic or alicyclic hydrocarbon solvent is an aliphatic hydrocarbon solvent having 5 or more carbon atoms or an alicyclic hydrocarbon solvent having 5 or more carbon atoms, and the aromatic hydrocarbon solvent is an aromatic hydrocarbon solvent having 6 or more carbon atoms.

8. The method of claim 1, wherein the reacting of the mixed solvent in step b) with the magnesium compound solution in step a) is performed under conditions in which the mixed solvent is maintained at a temperature in a range of from −50° C. to 50° C.

9. The method of claim 1, wherein the support in step c) is reacted with the titanium compound and the electron donor in the presence of a hydrocarbon solvent.

10. The method of claim 1, wherein in step c), the reacting of the support with the titanium compound and the electron donor is repeated twice or more.

11. The method of claim 1, wherein the reacting of the support with the titanium compound and the electron donor in step c) includes a process of heating the system to a temperature in a range of from 80° C. to 130° C., aging the system for a period of time in a range of from 1 hr to 3 hrs, and then washing the system.

12. The method of claim 1, wherein the electron donor in step c) is reacted at a ratio in a range of from 0.01 to 1 mole per mole of the magnesium halide compound.

13. A method for preparing polypropylene comprising:
adding a catalyst prepared by the method of claim 1, a co-catalyst, an external electron donor and hydrogen to a polymerization reactor; and
introducing propylene to the polymerization reactor followed by polymerization.

14. The method of claim 13, wherein polypropylene having a bulk density of 0.45 g/ml or more is prepared.

15. The method of claim 13, wherein in step b), the aliphatic or alicyclic hydrocarbon solvent is an aliphatic hydrocarbon solvent having 5 or more carbon atoms or an alicyclic hydrocarbon solvent having 5 or more carbon atoms, and the aromatic hydrocarbon solvent is an aromatic hydrocarbon solvent having 6 or more carbon atoms.

* * * * *